US005709832A

United States Patent [19]

Hayes et al.

[11] Patent Number: 5,709,832

[45] Date of Patent: Jan. 20, 1998

[54] METHOD OF MANUFACTURING A PRINTED ANTENNA

[75] Inventors: Gerard James Hayes, Wake Forest; Ross Warren Lampe, Raleigh, both of N.C.

[73] Assignee: Ericsson Inc., RTP, N.C.

[21] Appl. No.: 460,578

[22] Filed: Jun. 2, 1995

[51] Int. Cl.[6] .......... B29C 45/14

[52] U.S. Cl. .......... 264/272.11; 264/271.1

[58] Field of Search .......... 264/129, 135, 264/259, 267, 265, 271.1, 275, 297.2, 297.8, 272.11

[56] References Cited

U.S. PATENT DOCUMENTS

| | | | |
|---|---|---|---|
| 3,231,894 | 1/1966 | Nagai . | |
| 3,585,536 | 6/1971 | Braginski | 333/31 |
| 4,138,681 | 2/1979 | Davidson et al. | 343/702 |
| 4,154,788 | 5/1979 | Hockensmith | 264/129 |
| 4,356,492 | 10/1982 | Kaloi | 343/700 |
| 4,370,657 | 1/1983 | Kaloi | 343/700 |

(List continued on next page.)

FOREIGN PATENT DOCUMENTS

| | | | |
|---|---|---|---|
| 0590534 | 4/1994 | European Pat. Off. | H01Q 1/24 |
| 0616383 | 9/1994 | European Pat. Off. | H01Q 1/27 |
| 0642189 | 3/1995 | European Pat. Off. | H01Q 1/24 |
| 0649181 | 4/1995 | European Pat. Off. | H01Q 1/36 |
| 3129045 | 10/1982 | Germany | H01Q 21/06 |
| 4324480 | 1/1995 | Germany | H01Q 9/30 |
| 2229321 | 9/1990 | United Kingdom | H01Q 1/50 |
| 9105374 | 4/1991 | WIPO | H01Q 9/40 |
| 9312559 | 6/1993 | WIPO | H01Q 9/42 |
| 9428595 | 12/1994 | WIPO | H01Q 19/09 |

OTHER PUBLICATIONS

Timothy L. Higby & Donald Beaumont, "High Frequency Whip Antenna (800 MHZz)" Motorola Technical Developments, vol. 6, Oct. 1986.

Electronics Letter vol. 30 n.21, dated Oct. 13, 1994, Stevenage pp. 1725–1726, XP002011407 Lebbar et al., "Analysis and Size Reduction of Various Printed Monopoles with Different Shapes".

Patent Abstract of Japan, vol. 14 No. 308, Yutaka, et al, Jul. 1990 JP2098202.

IEEE Transactions on Antennas and Propogation, vol. AP-32, No. 4, XP002011484, Nakano et al., "Shortening Ratios of Modified Dipole Antennas", Apr. 1984.

Conference Proceedings RF Expo West EMC/ESD International, dated Jan. 29, 1995–Feb. 1, 1995, San Diego, CA, pp. 117–124, X000492813 Breed, "Multi-Frequency Antennas for Wireless Applications".

U.S. Patent Application SN 08/459,959 printed Antenna Having Electrical Length Greater Than Physical Length by Gerard Hayes et al., filed Jun. 2, 1995 (Now abandonded).

U.S. Patent Application SN 08/459,553, Multiple Band Printed Monopole Antenna by Gerard Hayes et al., filed Jun. 2, 1995.

U.S. Patent Application SN 08/549,235 Multiple Band Printed Monopole Antenna by Gerard Hayes et al. filed Jun. 2, 1995.

U.S. Patent Application SN 08/459,237 Printed Monopole Antenna by Gerard Hayes, et al., filed Jun. 2, 1995.

Bahl, I.J., "Microstrip Antennas," pp. 1–7 and 214–220 (1980).

*Primary Examiner*—Angela Y. Ortiz

[57] ABSTRACT

A method of manufacturing a printed antenna is disclosed which involves the steps of: providing a printed circuit board of desired length and width having a first side, a second side, a feed open, and an open end; fabricating a main radiating element of a desired electrical length on one of the printed circuit board sides; and, overmolding both sides of the printed circuit board. The printed circuit board is made of a dielectric material having a minimum degree of flexibility and the overmolding step is accomplished by injection or insertion molding a low-loss dielectric material on the printed circuit board. In addition, the manufacturing method includes the step of incorporating a feed port with the printed antenna, wherein the main radiating element is coupled to a signal feed portion thereof.

8 Claims, 1 Drawing Sheet

U.S. PATENT DOCUMENTS 4,381,566 4/1983 Kane .......... 455/193
4,459,593 7/1984 Hall et al. .......... 343/700
4,475,107 10/1984 Makimoto et al. .......... 343/700
4,644,366 2/1987 Scholz .......... 343/895
4,725,395 2/1988 Gasparaitis et al. .......... 264/250
4,800,392 1/1989 Garay et al. .......... 343/700
4,849,765 7/1989 Marko .......... 343/702
4,860,020 8/1989 Wong et al. .......... 343/828
5,008,681 4/1991 Cavallaro et al. .......... 343/700
5,075,691 12/1991 Garay et al. .......... 343/830
5,124,733 6/1992 Hancishi .......... 343/700
5,231,412 7/1993 Eberhardt et al. .......... 343/790
5,262,791 11/1993 Tsuda et al. .......... 343/700
5,270,722 12/1993 Delestre .......... 343/700
5,313,216 5/1994 Wang et al. .......... 343/700
5,363,114 11/1994 Shoemaker .......... 343/713
5,382,959 1/1995 Pett et al. .......... 343/700
5,389,937 2/1995 Kaloi .......... 343/700
5,406,295 4/1995 Baranski et al. .......... 343/713
5,463,406 10/1995 Vannatta et al. .......... 343/702
5,489,914 2/1996 Breed .......... 343/818

METHOD OF MANUFACTURING A PRINTED ANTENNA

BACKGROUND OF THE INVENTION

1. Field of the Invention

The present invention relates to printed antennas for radiating or receiving electromagnetic signals and, more particularly, to a method of manufacturing such printed antennas.

2. Description of Related Art

It has been found that a monopole antenna mounted perpendicularly to a conducting surface provides an antenna having good radiation characteristics, desirable drive point impedance, and relatively simple construction. As a consequence, monopole antennas have been used with portable radios, cellular telephones, and other personal communication systems. In order to advance the art of such monopole antennas, several printed monopole antennas have been developed and are disclosed in patent applications entitled "Printed Monopole Antenna," "Multiple Band Printed Monopole Antenna," "Multiple Band Printed Monopole Antenna," and "Printed Monopole Antenna Having Electrical Length Greater Than Its Physical Length," (Ser. Nos. 08/459,237, 08/459,235, 08/459,553, and 08/459,959, respectively) each being filed concurrently herewith, which are owned by the assignee of the present invention, and hereby incorporated by reference.

In particular, two aspects of the construction of these antennas should be noted. First, each of the aforementioned printed antennas utilize at least one printed circuit board which preferably is made of a flexible dielectric material. In this regard, it is understood that past printed circuit boards have been made of a generally rigid material which is apt to break or crack under a certain minimal force. Such printed circuit boards not only cause the antenna to be susceptible to the need for repair and replacement, but also constitute a safety hazard. Secondly, it is apparent that such printed antennas require protection from environmental conditions and need to become more rugged overall to sustain even normal usage. Moreover, without an appropriate covering, such a printed antenna has a rather unattractive appearance.

Accordingly, it would be desirable for a printed antenna to be manufactured with a printed circuit board made of a sufficiently flexible dielectric material, but also with an adequate protective covering which is also aesthetically pleasing.

In light of the foregoing, a primary object of the present invention is to provide a method of manufacturing a printed antenna.

Another object of the present invention is to provide a method of manufacturing a printed antenna which causes the printed antenna to be durable, protected from environmental conditions, and have an attractive appearance.

Still another object of the present invention is to provide a method of manufacturing a printed antenna in which a sufficient amount of flexibility is incorporated therein to resist breakage and prevent accidents stemming therefrom.

A further object of the present invention is to provide a method of manufacturing a printed antenna which can be utilized in a broad range of applications.

These objects and other features of the present invention will become more readily apparent upon reference to the following description when taken in conjunction with the following drawing.

SUMMARY OF THE INVENTION

In accordance with one aspect of the present invention, a method of manufacturing a printed antenna is disclosed which involves the steps of: providing a printed circuit board of desired length and width having a first side, a second side, a feed end, and an open end; fabricating a main radiating element of a desired electrical length on one of the printed circuit board sides; and, overmolding both sides of the printed circuit board. The printed circuit board is made of a dielectric material having a minimum degree of flexibility and the overmolding step is accomplished by injection or insertion molding a low-loss dielectric material on the printed circuit board. In addition, the manufacturing method includes the step of incorporating a feed port with the printed antenna, wherein the main radiating element is coupled to a signal feed portion thereof.

In a second aspect of the present invention, further steps of manufacturing the printed antenna permit it to operate within more than one frequency band. Also, an additional manufacturing step would include the fabrication of a reactive element on the printed circuit board to define an extended ground plane or an impedance matching network.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
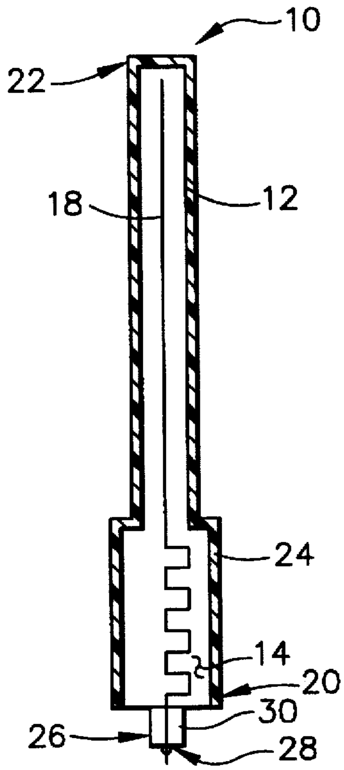
FIG. 1 is schematic cross-sectional view of a printed antenna manufactured in accordance with the method of the present invention.
Figure 2:
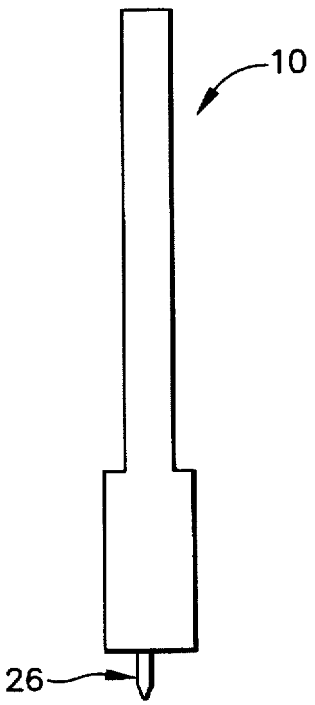
FIG. 2 is a schematic top side view of the printed antenna depicted in FIG. 1 after it has been overmolded.

Referring now to the drawings in detail, wherein identical numerals indicate the same elements throughout the figures, FIGS. 1 and 2 depict a printed monopole antenna 10 of the type used with radio transceivers, cellular telephones, and other personal communications equipment having a single frequency bandwidth of operation. As best seen in FIG. 1, printed monopole antenna 10 includes a printed circuit board 12, which preferably is planar in configuration having a length l, a width w, a first side 14 (see FIG. 1), a second side 16 (see FIGS. 3 and 6), a feed end 20, and an opposite open end 22. It will be noted that printed monopole antenna 10 includes a monopole radiating element in the form of a first conductive trace 18 formed on first side 14 of printed circuit board 12. In addition, an overmolding layer 24 is applied to printed monopole antenna 10 for protection against environmental conditions, as well as to provide a more aesthetically pleasing appearance.

With respect to printed circuit board 12, it is preferred that it be made of a dielectric material having a minimum degree of flexibility in order to permit bending and flexing of printed monopole antenna 10 without risk of breakage and potential injury therefrom. Exemplary dielectric materials having such flexibility include polyamide, polyester, and the like. However, it will be understood that any dielectric material having a degree of flexibility where printed circuit board 12 has an angle of deflection in the range of −90° to +90° will be acceptable for use in printed monopole antenna 10, with a preferred range of flexibility where printed circuit board 12 has an angle of deflection of −180° to +180° being optimum.

First conductive trace 18 is preferably fabricated on printed circuit board 12 by a film photo-imaging process or other known technique. In this regard, first conductive trace 18 is preferably made of a conductive material, such as copper or a conductive ink. One manner of fabricating first conductive trace 18 on printed circuit board 12 involves providing a layer of conductive material to first side 14 of printed circuit board 12, etching a desired pattern for first conductive trace 18 onto the conductive layer, and then removing the conductive material which is not a part of first conductive trace 18. This fabrication process is very efficient, especially when conductive traces are formed on both sides of printed circuit board 12 as discussed hereinafter.

With respect to overmolding layer 24, it will be recognized that application of this layer may be accomplished by either injection molding or insertion molding. With injection molding, printed circuit board 12 is positioned in a molding tool while overmolding material is injected around the assembly. Multiple injections may be used to create the required overmolding form. Insertion molding applies to a procedure in which the overmolding layer has already been pre-formed and printed circuit board 12 is inserted into the overmolding. Thereafter, final assembly is concluded when overmolding layer 24 is bonded together to form a single assembly. Low-loss dielectric material is preferably utilized for overmolding layer 24, with polyurethane being one exemplary material.

As seen in FIG. 1, it is advantageous to incorporate a feed port 26 or other connector with printed monopole antenna 10. Feed port 26 includes a signal feed portion 28 and a ground portion 30, with signal feed portion 28 being connected to first conductive trace 18.

Figure 3:
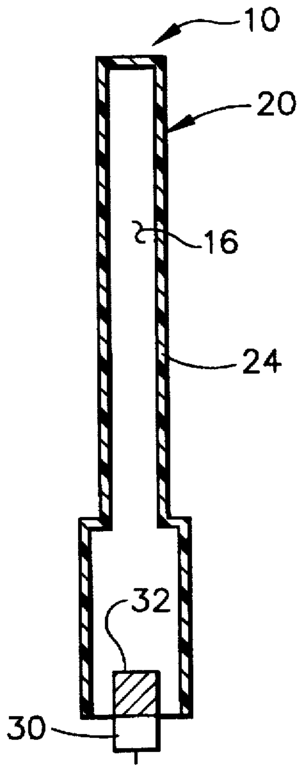
FIG. 3 is a schematic cross-sectional bottom side view of the printed antenna depicted in FIG. 1, which has been modified to define an extended ground plane therefor.

As seen in FIG. 3, a reactive element in the form of a second conductive trace 32 may be fabricated on second side 16 of printed circuit board 12 in order to provide a extended ground plane for printed monopole antenna 10. This reactance element and its function are described in greater detail in a patent application entitled "Printed Monopole Antenna," Ser. No. 08/459,237, filed concurrently herewith, which is also owned by the assignee of the present invention and hereby incorporated by reference. It will be understood that second conductive trace 32 is sized to provide an impedance match with first conductive trace 18 for broadband operation of printed monopole antenna 10. Accordingly, second conductive trace 32 will be coupled to ground portion 30 of feed port 26.

Figure 4:
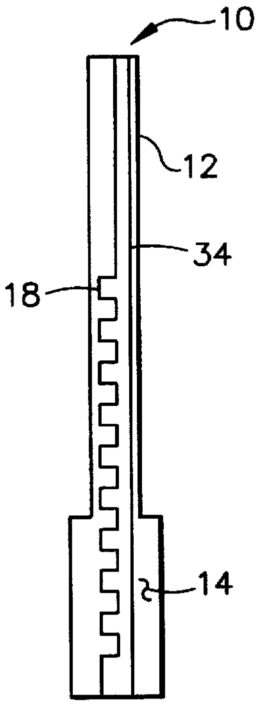
FIG. 4 is a schematic top side view of a multiple band printed antenna manufactured in accordance with the method of the present invention prior to overmolding.

As further seen in FIG. 4, at least one additional radiating element in the form of a third conductive trace 34 may also be fabricated on first side 14 of printed circuit board 12 in order to enable dual frequency band operation for printed monopole antenna 10. This multiple band printed antenna is described and shown in more detail in a patent application entitled "Multiple Band Printed Monopole Antenna," Ser. No. 08/459,235, filed concurrently herewith, which is also owned by the assignee of the present invention and hereby incorporated by reference. As such, it will be understood that third conductive trace 34 will have an electrical length different from first conductive trace 18, although the physical lengths of first and third conductive traces 18 and 34, respectively, may be substantially equivalent (as seen in FIG. 4) but need not be substantially equivalent.

Figure 5:
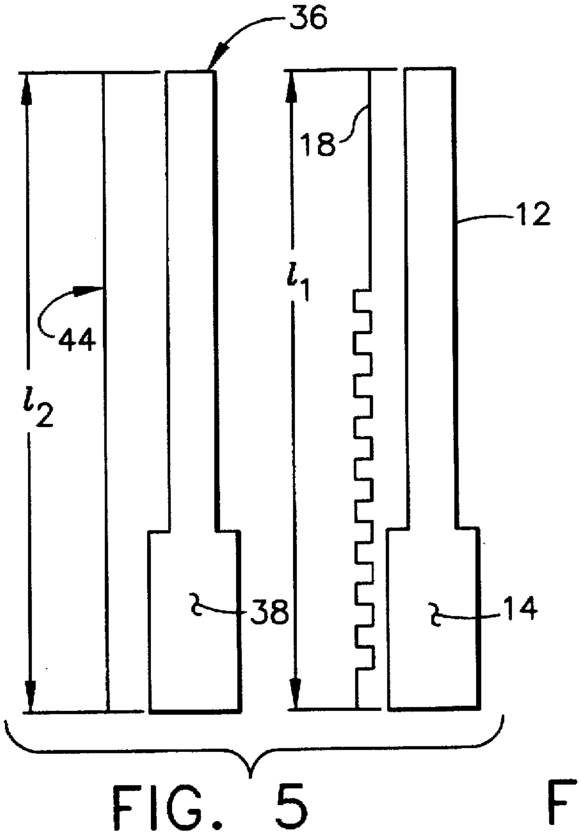
FIG. 5 is an exploded, schematic top side view of an alternative embodiment for a multiple band printed antenna manufactured in accordance with the method of the present invention prior to overmolding.

As seen in FIG. 5 and further described in a patent application also entitled "Multiple Band Printed Monopole Antenna," Ser. No. 08/459,553, filed concurrently herewith, which is also owned by the assignee of the present invention and hereby incorporated by reference, another configuration for enabling printed monopole antenna 10 to operate at multiple frequency bands is shown. There, a second printed circuit board 36 is provided having a configuration substantially similar to first printed circuit board 12, with a first side 38, a second side (not shown), a feed end 40, and an opposite open end 42. At least one radiating element in the form of a fourth conductive trace 44 is fabricated on second printed circuit board first side 38, wherein printed monopole antenna 10 is then resonant within at least one additional frequency band. Of course, it will be understood that overmolding of printed monopole antenna 10 would include forming layer 24 over both first and second printed circuit boards 12 and 36, respectively. As part of the process in manufacturing this particular configuration, a specified distance will preferably be provided between first and second printed circuit boards 12 and 36 in order to maintain a minimum voltage standing wave ratio at the feed point where the signal enters printed monopole antenna 10.

Figure 6:
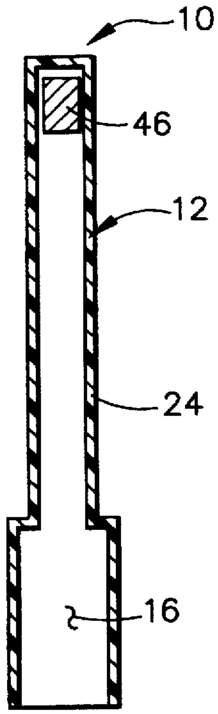
FIG. 6 is a schematic cross-sectional bottom side view of the printed antenna depicted in FIG. 1, which has been modified to permit multiple band operation.

Yet another alternative embodiment for printed monopole antenna 10 which enables it to operate within more than one frequency band is depicted collectively by FIGS. 1 and 6, wherein first conductive trace 18 is provided on first side 14 of printed circuit board 12 and a parasitic element 46 is applied to second side 16 of printed circuit board 12. This configuration is described in more detail in a patent application entitled "Multiple Band Printed Monopole Antenna," Ser. No. 08/459,959, filed concurrently herewith, which is also owned by the assignee of the present invention and hereby incorporated by reference. Parasitic element 46, which is utilized to tune the second resonant response of first conductive trace 18, is made of a conductive material but sized so as to be a non-resonant element. It will be seen from FIG. 6 that parasitic element 46 is preferably positioned at open end 22 of printed circuit board 12. By positioning parasitic element 46 at the proper location along printed circuit board second side 16 and giving it an appropriate size and area, the second frequency band of operation for printed monopole antenna 10 will not include an integer multiple of a primary resonance frequency of first conductive trace 18.

Although several different embodiments of printed antennas are discussed herein, it will be understood that the manufacturing of each one essentially includes the steps of providing the required number of printed circuit boards, fabricating the desired conductive traces on one or both sides of such printed circuit board, and then overmolding the printed circuit board with a layer of low-loss dielectric material.

Having shown and described the preferred method of manufacturing of the present invention, further adaptations to such method can be accomplished by appropriate modifications by one of ordinary skill in the art without departing from the scope of the invention.

What is claimed is:

1. A method of manufacturing a printed monopole antenna, comprising the following steps:

(a) providing a first substantially planar printed circuit board of desired length and width having a first side, a second side, a feed end, and an open end, wherein said first printed circuit board is made of a dielectric material having at least a minimum degree of flexibility;

(b) incorporating a feed port with said printed monopole antenna, said feed port having a signal feed portion and a ground portion;

(c) fabricating a main radiating element of a desired electrical length on said first printed circuit board first side, wherein said main radiating element is coupled to said signal feed portion of said feed port;

(d) fabricating at least one additional radiating element having an electrical length different than said main radiating element electrical length on said first printed circuit board first side, said additional radiating elements not being connected to said feed port, wherein said printed monopole antenna is resonant at a plurality of frequency bands through electrical coupling of said additional radiating elements with said main radiating element; and (e) overmolding both sides of said printed circuit board.

2. A method of manufacturing a printed monopole antenna, comprising the following steps:

(a) providing a first substantially planar printed circuit board of desired length and width having a first side, a second side, a feed end, and an open end, wherein said first printed circuit board is made of a dielectric material having at least a minimum degree of flexibility;

(b) fabricating a main radiating element of a desired electrical length on said first printed circuit board first side;

(c) providing a second substantially planar printed circuit board of desired length and width having a first side and a second side, wherein said second printed circuit board is positioned so that said second printed circuit board second side is adjacent said first printed circuit board first side;

(d) fabricating at least one additional radiating element on said second printed circuit board first side, wherein said printed monopole antenna is resonant at a plurality of frequency bands; and (e) overmolding said first and second printed circuit boards.

3. The method of claim 2, wherein said second printed circuit board is spaced a specified distance from said first printed circuit board to maintain a minimum voltage standing wave ratio at an antenna feed point.

4. A method of manufacturing a printed monopole antenna, comprising the following steps:

(a) providing a first substantially planar printed circuit board of desired length and width having a first side, a second side, a feed end, and an open end, wherein said first printed circuit board is made of a dielectric material having at least a minimum degree of flexibility;

(b) fabricating a main radiating element of a desired electrical length on said first printed circuit board first side;

(c) fabricating a parasitic element of specified area on said first printed circuit board second side, said parasitic element tuning said main radiating element to have a secondary resonance within a desired frequency band; and (d) overmolding both sides of said printed circuit board.

5. The method of claim 4, wherein said parasitic element is made of a conductive material.

6. The method of claim 4, wherein said parasitic element is sized to be a non-resonant element.

7. The method of claim 4, wherein said parasitic element is positioned at said open end of said first printed circuit board second side.

8. The method of claim 4, wherein said desired frequency band does not include an integer multiple of a primary resonance frequency of said main radiating element.

* * * * *